(12) United States Patent
Kaufmann

(10) Patent No.: US 9,863,713 B2
(45) Date of Patent: Jan. 9, 2018

(54) SYSTEMS AND METHODS FOR REAL-TIME MONITORING OF EXPECTED DURATION OF TEMPERATURE CONTROL

(71) Applicant: CARTASENSE LTD., Petach Tikva (IL)

(72) Inventor: Yaron Kaufmann, Tel-Aviv (IL)

(73) Assignee: CARTE-SENSE, Petach Tikva (IL)

( * ) Notice: Subject to any disclaimer, the term of this patent is extended or adjusted under 35 U.S.C. 154(b) by 177 days.

(21) Appl. No.: 14/552,537

(22) Filed: Nov. 25, 2014

(65) Prior Publication Data

US 2015/0144294 A1 May 28, 2015

Related U.S. Application Data

(60) Provisional application No. 61/908,789, filed on Nov. 26, 2013.

(51) Int. Cl.
*F28D 20/02* (2006.01)
*F28D 20/00* (2006.01)

(52) U.S. Cl.
CPC .......... *F28D 20/028* (2013.01); *F28D 20/02* (2013.01); *F28D 2020/0008* (2013.01); *Y02E 60/145* (2013.01)

(58) Field of Classification Search
CPC ...................... G01K 2207/08; H05B 33/0803
USPC ......................................................... 340/4.2
See application file for complete search history.

(56) References Cited

U.S. PATENT DOCUMENTS

| | | | | |
|---|---|---|---|---|
| 6,112,537 A | * | 9/2000 | Broadbent | B65D 25/08 62/293 |
| 6,209,343 B1 | * | 4/2001 | Owen | A01N 1/02 252/67 |
| 6,408,261 B1 | * | 6/2002 | Durbin | B30B 9/3007 100/99 |
| 7,187,299 B2 | * | 3/2007 | Kunerth | G01L 19/083 340/539.1 |
| 2010/0001008 A1 | * | 1/2010 | McCarthy | B65D 13/02 220/592.2 |
| 2012/0109399 A1 | * | 5/2012 | Tran | H02J 3/14 700/296 |
| 2012/0197810 A1 | * | 8/2012 | Haarmann | G06Q 10/0832 705/302 |

(Continued)

*Primary Examiner* — Vernal Brown
(74) *Attorney, Agent, or Firm* — Reches Patents

(57) ABSTRACT

Various embodiments of systems and methods for protecting various products and materials that are sensitive to variations in temperature, during the time that such sensitive products and materials are in transit or in storage. Phase Change Materials ("PCM") are used to absorb heat, and thereby protect the sensitive products and materials. Various systems and methods for measuring current levels, and changes in, the residual latent energy in the PCM, and thereby determining the expected duration of temperature control for the sensitive products and materials. Various systems and methods for aggregating the measurements of changes in the residual latent energy of the PCM, and for communicating such measurements by wireless or wireline communication to an outside receiver of such information. Various systems and methods for taking action, based on measurements of changes in residual latent energy of the PCM, for protecting the temperature sensitive products or materials.

22 Claims, 5 Drawing Sheets

(56) References Cited

U.S. PATENT DOCUMENTS

2013/0015191 A1* 1/2013 Seagle .................. B65D 19/18
220/592.01

* cited by examiner

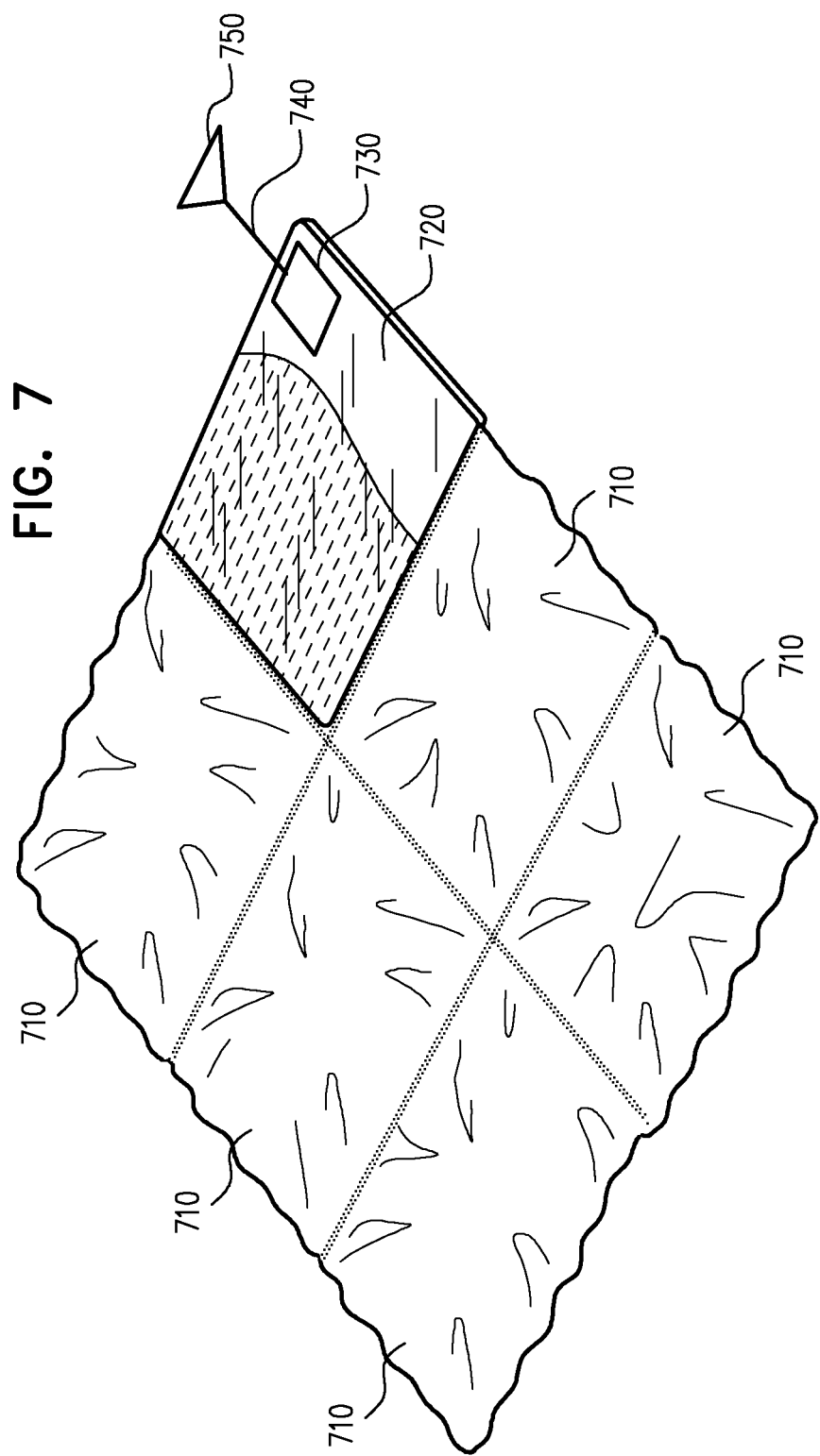

SYSTEMS AND METHODS FOR REAL-TIME MONITORING OF EXPECTED DURATION OF TEMPERATURE CONTROL

CROSS-REFERENCE TO RELATED APPLICATIONS

This application claims priority to U.S. Provisional Patent Application No. 61/908,789, titled "Real Time Monitoring of Expected Duration of Temperature Control", filed Nov. 26, 2013, the disclosure of which is incorporated herein by reference in its entirety.

FIELD OF THE INVENTION

Various embodiments relate to the use of Phase Change Materials for the protection of certain products or materials that are sensitive to variations in temperature.

BACKGROUND OF THE INVENTION

Systems and networks for real-time monitoring of expected duration of temperature control. There are certain Phase Change Materials ("PCMs") that have relatively high "enthalpy of fusion" (also known as "heat of fusion"). PCMs with high enthalpy are often used to preserve the temperature of some substance. This occurs, for example, when the temperature-sensitive substance is in storage, or in transit via a vehicle of some sort. Enthalpy is typically measured by equating energy of the material to internal energy plus pressure times volume, that is, $H=U+pV$. By measuring one or more of the characteristics of either p or V, the current enthalpy of material may be estimated, and the rate of change of the enthalpy may also be estimated.

Current methods of measuring and communicating factors for enthalpy suffer from one or more major defects, such as:

1. The package containing a PCM and or the package containing the sensitive product or material require a particular positional orientation during transit. Alterations in the transit will negatively impact the quality of measurements of the PCM.
2. There is no effective method for estimating in real-time the remaining duration of temperature control from the PCM.
3. There is no effective method for transmitting in real-time indications related to the remaining duration of temperature control from the PCM.
4. The environment of the PCM package and of the sensitive product or material is often hostile to effective communication from the PCM package to a point of information reception. For example, distance or EM interference may attenuate a signal from the PCM packaged to the point of information reception.
5. The form factor of a PCM package and package of sensitive product or material is hostile to effective communication from the PCM package to a point of information reception. For example, the form of the packages may be such that the distance between a sensor and the point of information reception is increased or blocked.
6. It is often difficult and expensive to monitor multiple PCM packages in real time.
7. Ice or dried ice is often used as a type of PCM, but due to various properties of water, measurement of the current enthalpy of the ice or dried ice, it is often difficult to monitor the remaining duration of temperature control available from the PCM material.

There is therefore a need for various systems and methods that will overcome or ameliorate one or more of the aforementioned difficulties in measuring and communicating factors for enthalpy.

SUMMARY OF THE INVENTION

Described herein are systems and methods for real-time (or close to real-time) monitoring of the expected duration of temperature control, particularly in regard to measuring factors related to PCMs that are used in the transit of sensitive products and materials.

One embodiment is a system for protecting products or materials that are sensitive to variations in temperature. The system may include a PCM container containing PCM material that is in contact with or close proximity to products or materials that are sensitive to variations in temperature, the PCM material is in a container that has at least one section composed of flexible material that changes shape in relation to a change in the enthalpy within the PCM, a container that contains a non-solid and that has at least one section composed of flexible material that changes shape in relation to a change in pressure, and a pressure sensor that senses the pressure or fluctuations of pressure in the container with the non-solid. At least one flexible section of the PCM container is in physical contact with the at least one flexible section of the container with gas. Some or all of the section of the PCM container that are not in contact with a flexible section of the container with non-solid, and some or all of the sections of the container with non-solid that are not in contact with the PCM container, are rigid sections that maintain their shape against changes in pressure.

One embodiment is a system for protecting products or materials that are sensitive to variations in temperature. The system may include a PCM container containing PCM, that is in contact with or close proximity to products or materials that are sensitive to variations in temperature, and a plurality of sensors that both measure one or more monitored properties of the PCM in the PCM container, and communicate such measurements to an integration unit. In some embodiments, the integration unit is communicatively connected to all of the sensors, receives measurements that are communicated by the sensors, aggregates the measurements, and then transmits the aggregated measurements to a receiver that receives such aggregated measurements. In some embodiments, the aggregation unit is configured to transmit wirelessly, and also configured to transmit by wireline. In some embodiments, there are multiple PCM containers and one or more sensors are in contact with or close proximity to each of the PCM containers; and One embodiment is a method for protecting products or materials that are sensitive to variations in temperature. It includes the steps of (1) creating a system for protecting products or material that are sensitive to variation in temperature; wherein the system comprises a PCM container containing PCM that is in contact with or close proximity to products or materials that are sensitive to variations in temperature; wherein said PCM container has at least one section composed of flexible material that changes shape in relation to a change in the enthalpy within the PCM; a container containing a gas, and said container with gas has at least one section composed of flexible material that changes shape in relation to a change in pressure; a pressure sensor that senses the pressure or fluctuations of pressure in the container with gas; wherein the at least one flexible section of the PCM container is in physical contact with the at least one flexible section of the container with gas; and wherein all of the sections of the PCM container that are not in contact with a flexible section of the container with gas, and all of the sections of the container with gas that are not in contact with the PCM container, are rigid sections that maintain their shape against changes in pressure. each have at least one have at least one flexible contact surface; (2) measuring in real time, by the sensor, the pressure created on the container with gas from the changing volume of the container with the PCM; and (3) communicating such measurements from the sensor to a communication unit. In various alternative embodiments, the system is in transit, and a variety of actions are taken to protect the sensitive products or materials, including for example, changing the transit route, adding additional sensitive products or materials, removing part of the sensitive products or materials, adding or removing PCM, and adding or removing thermal blanketing. Some of these actions may be taken in embodiments where the system is not in transit but rather is in storage—for example, adding or removing sensitive products or materials to the system, adding or removing PCM, and adding or removing thermal blanketing.

BRIEF DESCRIPTION OF THE DRAWINGS

The embodiments are herein described, by way of example only, with reference to the accompanying drawings. No attempt is made to show structural details of the embodiments in more detail than is necessary for a fundamental understanding of the embodiments. In the drawings:

FIG. 7 illustrates one alternative embodiment of a thermal packaging solution, including multiple soft shelled PCM containers and a transceiver in communication with an outside transceiver.

DETAILED DESCRIPTION OF THE INVENTION

Glossary

Figure 1:
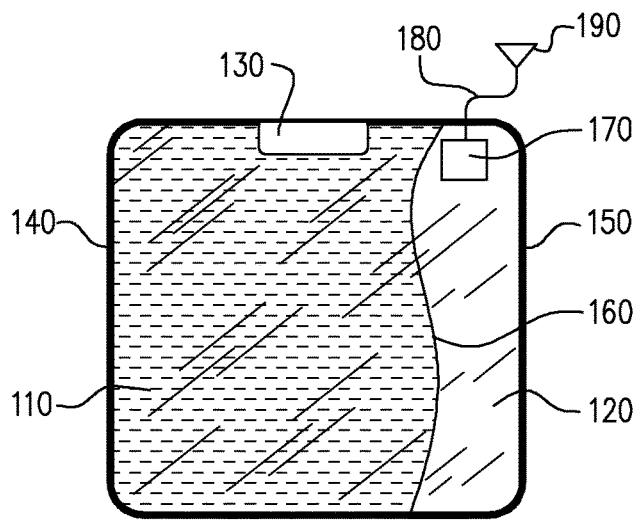
FIG. 1 illustrates one alternative embodiment of a system of a thermal packaging solution.

As used herein, "sensitive product or material" is product or material that is in transit or in storage, and whose temperature must be kept either within a prescribed range, above a certain minimum or below a certain maximum. Non-limiting examples of sensitive product or material are various food products, pharmaceuticals, chemicals, and electronics, which may be damaged or degraded if exposed to temperatures beyond a certain temperature range.

As used herein, "PCM" is a an acronym for "Phase Change Material", and it means a material that has a relatively high heat of fusion, which implies that the material may store a relatively large amount of energy as it changes from solid to liquid form, and that the material may release a relatively large amount of energy as it changes a liquid to a solid. Similarly, PCM material may be a liquid, in which the material may store a relatively large amount of energy as it changes from a liquid to a gas, and the material may release a relatively large amount of energy as it changes from a gas to a liquid.

As used herein, "non-solid" means a PCM material that may be either a liquid or a gas.

As used herein, "heat of fusion" means the amount of energy required to cause a PCM to phase from solid to liquid form, and also the amount of energy that would be released by changing a PCM from liquid to solid form. "Enthalpy of fusion" is a phrase that is the equivalent of "heat of fusion".

As more energy is applied to a PCM, the material may begin to change form, but the temperature of the material remains essentially constant until substantially all of the PCM has changed its form. As used herein, "duration of the temperature control" is the duration of time during which more energy is added to, or removed from, the PCM until substantially all of the PCM has changed its form and the temperature of the PCM begins to change. This may be measured either by duration of time, or duration of amount of energy that must be added to the PCM to complete the phase change, or both. As used herein, the phrases "latent energy availability" and "availability of latent energy" are both equivalent to "duration of the temperature control".

As used herein, "residual latent energy" is the amount of energy that must be added to PCM in order to complete the phase change of the PCM. It is determined by measuring one or more "monitored properties" of the PCM.

As used herein, "rate of energy absorption" is the rate at which the PCM is absorbing energy. Knowledge of the rate of energy absorption and of the residual latent energy enables calculation of the duration of the temperature of control. The equation is (duration of the temperature control)=(residual latent energy at a point in time)/(rate of energy absorption at the same point in time).

As used herein, the term "sensor" may include one or more of the various structures including a "sensing element", power connections, battery or other means for power storage, a memory or other means to store digital data, a wireless or wireline means of transferring data to a transceiver at the point of the sensor, a wireless or wireline means of transferring data to an outside communication point, and at least one enclosure.

As used herein, "monitored property" includes any or all of the properties of PCM that may be measured in order to determine the residual latent energy of a certain quantity of PCM in a system. Such monitored properties may include, but without restriction, (1) the volume of the "PCM container"; (2) the electrical resistance and/or capacitance of the PCM; (3) the optical transparency of the PCM; (4) the acoustical properties of the PCM; (5) the electromagnetic propagation properties of the PCM; (6) the temperature of the PCM; and (7) the humidity of the environment in which the PCM is located.

As used herein, a "sensing element" is a sensor that measures one or more of the monitored properties directly or indirectly. As non-limiting examples, a pressure gauge may measure the pressure within a PCM container, the volume of the PCM package may be inferred from the pressure measurement, an ohmmeter may measure the electrical resistance of the PCM; and a thermometer may measure the temperature of the PCM.

As used herein, "PCM package" is a structure with a PCM container and a container holding a non-solid.

As used herein, "PCM container" is a container that includes a single PCM unit, however such a unit is measured in a system. A system may include two or more PCM containers, but each such PCM container includes a single PCM unit. Two or more PCM containers may be connected physically, but in such a conglomeration each PCM container holds one PCM unit. As used herein, "thermal package" is the equivalent of "PCM container". In the art, a PCM container is sometimes referenced as "gel pack" or "thermal pack", but such terminology is not used herein.

As used herein, a "thermal packaging solution" is a packaging solution that comprises one or more PCM packages and/or PCM containers, the sensitive product or material in contact with one or more PCM packages and/or PCM containers, a box or other container containing the PCM packages and/or PCM containers and the sensitive product or material, insulation material, and sealing material. In some embodiments, the box of other container may include two or more sets of PCM packages and/or PCM containers and sensitive product or material. As used herein, the term "product packaging" is the equivalent of the term "thermal packaging solution".

As used herein, the term "ice" includes ice, dry ice, and other materials that are frozen in order to be used as a cooling agent.

As used herein, "critical information" is information included in a control decision, e.g., information that informs the recipient that a problem may occur, e.g. the remaining latent energy stored in a PCM, or that a PCM's remaining latent energy is lower than expected, or that a PCM's remaining latent energy is changing more rapidly than that of its neighboring PCM's. In a scenario wherein the remaining latent energy stored in a PCM is not within the expected range, than a decision of action may be taken. In a scenario wherein the remaining latent energy stored in a PCM is within the expected range, than a decision to continue transit without stopping may be taken.

As used herein, "closed loop opportunity period" is a period in which the package/container including the PCM is in an environment in which the action can be taken based on the monitored critical information. For example, a period in which the package is on a docking station, or in a warehouse, or at a stop station, or is being manually handled. In all of the above, the PCM can be inspected or replaced, and/or the PCM package or PCM container can be cooled, and/or other temperature control means can be applied and or another corrective means can be applied. In contrast, while the package is in transit, e.g. air freight; it is harder or impossible to take action to address critical information related to a single and or multiple packages.

As used herein, "transceiver" means a unit that may either transmit or receive information. However, in embodiments in which a transceiver solely transmits, the transceiver may be a one-way transmitter rather than a two-way transceiver, and in embodiments in which a transceiver solely receives, the transceiver may be a one-way receiver rather than a two-way transceiver.

FIG. 1 illustrates one alternative embodiment of a system of a thermal packaging solution, in which a gas container is on one side of a PCM container. 110 is a PCM container, containing PCM material. 120 is a gas container, containing gas. 130 is PCM plug which may be removed to add or remove PCM material from the PCM container. 140 a rigid box or other container about the PCM container. 150 is a rigid box about the gas container. 160 is a flexible surface between the PCM container and the gas container, which changes shape as a PCM material loses or gains latent heat, in which a hotter PCM reflects more pressure on flexible surface 160 from the PCM material and a colder PCM reflects less pressure on flexible surface 160 from the PCM container. 170 is a pressure sensor that measures the pressure within the gas container 120 and that is communicatively connected by 180 to a transceiver 190 which is in communicative connection with the outside world.

Figure 2:
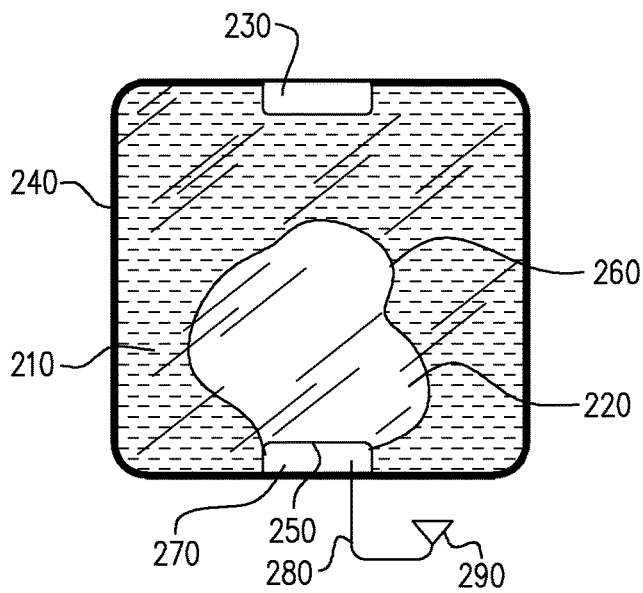
FIG. 2 illustrates one alternative embodiment of a system of a thermal packaging solution.

FIG. 2 illustrates one alternative embodiment of a system of a thermal packaging solution, in which a gas container is placed within a PCM container. Many of the components in FIG. 2 are comparable to the components in FIG. 1, but the shape of the gas container is much different. In FIG. 2, PCM container 210 contains PCM material, gas container 220 contains gas, PCM plug 230 allows the entry or exit of PCM material, 240 is a rigid box or other container about the PCM container, 250 is a rigid border with the gas container, 260 is a flexible surface between the PCM container and the gas container which changes shape as a PCM material loses or gains latent heat, 270 is a pressure sensor that measures pressure within the gas container 220, 280 is a connection between that the pressure sensor 270 and a transceiver 290 in connection with the outside world.

Figure 3:
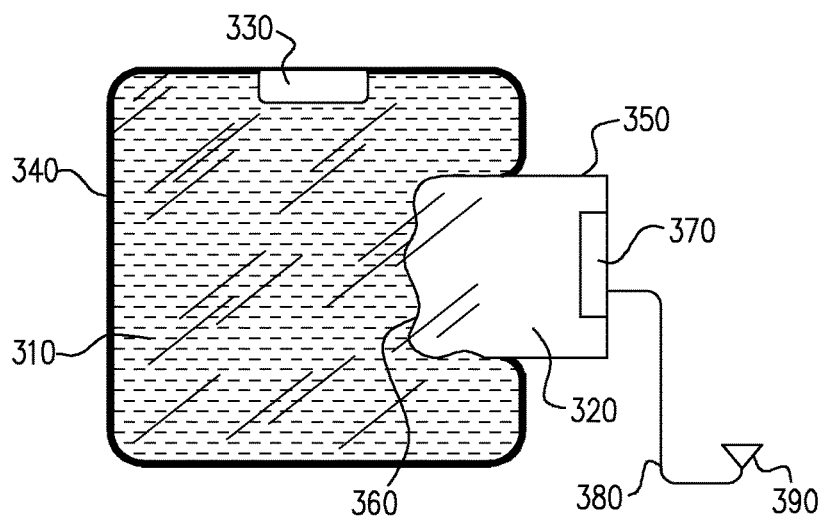
FIG. 3 illustrates one alternative embodiment of a system of a thermal packaging solution.

FIG. 3 illustrates one alternative embodiment of a system of a thermal packaging solution, in which a gas container is partially inserted into a PCM container. Many of the components in FIG. 3 are comparable to the components in FIG. 1 and FIG. 2, but the shape of the gas container is much different. In FIG. 3, PCM container 310 contains PCM material, gas container 320 contains gas, PCM plug 330 allows the entry or exit of PCM material, 340 is a rigid box or other container about the PCM container, 350 is a rigid border of the gas container, 360 is a flexible surface between the PCM container and the gas container which changes shape as a PCM material loses or gains latent heat, 370 is a pressure sensor that measures pressure within the gas container 320, 380 is a connection between that the pressure sensor 370 and a transceiver 390 in connection with the outside world.

The embodiments presented in FIG. 1-3 are orientation insensitive, that is, they can positioned in any physical orientation relative to the ground, and or the orientation may change over time without affecting the PCM package and or sensor functionality. Referring to the embodiments presented in FIGS. 1-3, in alternative embodiments, the PCM container is sealed without a plug, e.g., by heat welding, ultrasonic welding, gluing etc, after inserting the PCM material into the container, such that the PCM plug, as in 130, 230, 330 are not required, but in such embodiments the quantity of PCM material is not changed by addition or deletion. Referring to the embodiments presented in FIG. 1-3, in alternative embodiments the pressure sensor 170, 270, 370 is located in the PCM container and measures the pressure within the PCM container 110, 210, 310.

Figure 4:
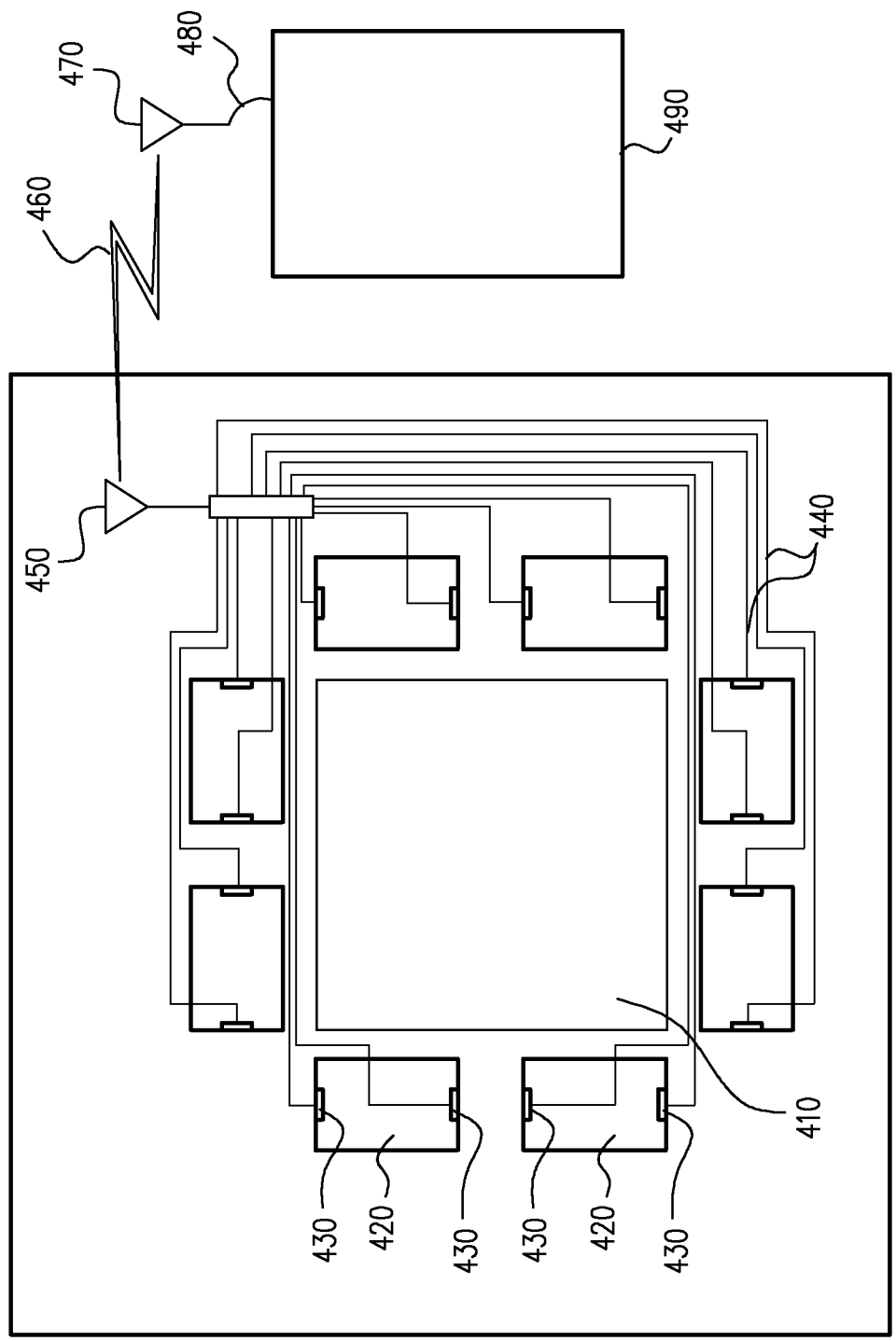
FIG. 4 illustrates one alternative embodiment of a system of a thermal packaging solution, with a communicative connection to an outside receiver.

FIG. 4 illustrates one alternative embodiment of a system of a thermal packaging solution, with a communication connection to an outside receiver. 410 is a container capable of encasing sensitive product or material. The container 410 includes multiple, PCM packages 420, in some embodiments, on more than one surface, any one of which may be in any of the forms illustrated and discussed in regards to FIGS. 1, 2, and 3. In the specific, non-limiting configuration showed in FIG. 4, each PCM package 420 has two pressure sensors 430, and all of the pressure sensors are communicatively connected by 440 to a transceiver 450. In other configurations, each PCM package 420 has one pressure sensors 430, and all of the pressure sensors are communicatively connected by 440 to a transceiver 450. Said connection, to transceiver 450 may be by wire or wireless. In some embodiments, the connection is through a wireless mesh network, wherein sensors included in the PCM packages, as part of the thermal packaging solution, form a wireless sensor mesh. The sensors are typically in relatively close proximity, and retransmit information received from other close proximity sensors. In this sense, "close proximity" is a measure of distance that is relative to the overall size of the system. In a system the size of an automobile interior, for example, "close proximity" may be equal to or less than 1.0 meter. In a system the size of a 16-wheel truck, the limit on close proximity would be greater, perhaps on the order of 5 or even 10 meters. In a small packing container, of say 1 cubic meter (that is, meter by meter by meter), "close proximity" might be any measure from say 0.1 to 0.5 meter.

In some embodiments, the mesh configuration enables using low power transmission units. In some embodiments the mesh network configuration enables transmitting within an environment that is not typically conducive to transmission, such as fluid containers, packaging materials containing metallic components, containers constructed with metallic components.

Transceiver 450 is communicatively connected by a link 460 to an external transceiver 470, which is connected by 480 to an information aggregator 490. In some embodiments, the information aggregator 490 is limited to receiving, recording, and maintaining measurements from the system sensors. In some embodiments, the aggregator includes additional information external to the system, such as expected temperatures and other atmospheric conditions on the transit path planned for the sensitive products or materials, and expected transit times for the sensitive products or materials. In some embodiments, information from the sensors and external information is used to predict current and future levels of latent heat in the PCM materials. In some embodiments, some or all of the foregoing information or predictions are used to project the current and projected state of the sensitive products or materials. In some embodiments, some or all of the foregoing information, predictions, and projections, are used to suggest or to determine specific actions that should be taken. Such actions might include, for example, replacing some or all of the PCM material in the PCM packages, changing the PCM packages, and or PCM containers, adding "PCM blankets" to the system as discussed in FIG. 6 below, changing a transit path, adding or subtracting a planned transit stop or layover, changing the quantity of PCM packages, PCM containers and or insulation materials within the thermal packaging solution. Changing the quantity of PCM packages and or insulation materials may be particularly important in some embodiments, in which the cost of transit may be significantly related to the weight of the products or materials being transported. Further, in some embodiments it may be possible, based on information, predictions, and projections, to reduce the quantity of the PCM material. throughout the transit or during portions of the transit. This reduction in the quantity of the PCM material reduces the total weight of the shipment in transit, thereby reducing the cost of the transit. In some embodiments it may be possible, based on information, predictions, and projections, to optimize the quantity of the PCM material included in the packaging solution. The optimized quantity changes being implemented during a closed loop opportunity period.

Predictions and/or projections may be made at the information aggregator 490, in which case 490 acts as a kind of planning and or optimization unit, or may be made by a separate planning unit or system that is in communicative contact with information aggregator 490.

For all of FIGS. 1-4, the PCM container may be in the shape of a ball, a cylinder, or a cone, in which case a section of the surface will be flexible. In other embodiments, the PCM container may be in the shape of a polyhedron, such as a box, octagonal prism or other or multi sided shape, in which case at least one portion of one side will be flexible. In other embodiments, the PCM container shape may be flexible and adaptive.

Figure 5:
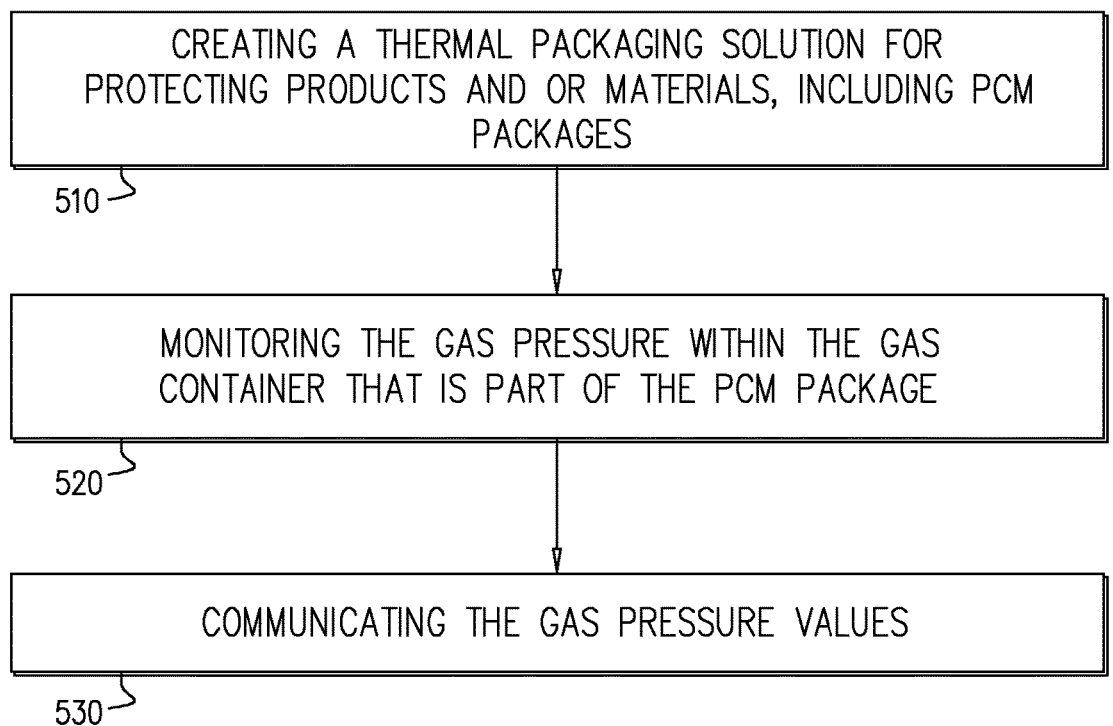
FIG. 5 illustrates one alternative embodiment of a method for protecting products or material by obtaining and communicating measurements of latent heat.

FIG. 5 illustrates one alternative embodiment of a method for protecting products or material by obtaining and communicating measurements indicative of latent heat in the PCM packages, in real-time (or close to real-time). In 510, a system is created for protecting sensitive products or materials. The configuration of the system may include any or all of the packaging solutions presented in FIGS. 1-4. In 520, information is gathered about the pressure in one or more gas containers located within the system. In 530, one or more measurements of pressure are communicated from pressure sensors to a transceiver, which may transmit such measurements to an external transceiver.

In some embodiments, real-time (or close to real-time) monitoring of critical information during the closed loop opportunity period allows a variety of actions to be taken that improve the efficiency of the system. Any or all of these actions may be alternative embodiments of the method illustrated in FIG. 5, and similarly, the structure that enables such actions may be part of any of the structures illustrated in FIGS. 1-4 and 7, respectively. For example, based on various measurements of pressure in a PCM package, estimates may be made of the latent energy reserve in the PCM material, and hence estimates may be made of the time period remaining during which the temperature of the sensitive products or materials may be maintained. Actions are then planned to maintain the temperature of the sensitive products or materials, and hence to protect them from damage. For example:

(1) The amount of sensitive products or materials in the system may be reduced, to increase the ratio of PCM packages and/or thermal blankets to sensitive products or materials.

(2) The latent energy reserve may be such that the amount of sensitive products or materials in transit is increased rather than merely maintained or decreased. This means that more products or materials may be delivered, which increases the overall effectiveness of the system. In cases in which air transit is planned, this may be particularly advantageous.

(3) Changes may be made in the transit route, the means of transportation (for example, truck, or train, or air freight), the number of stops, the actions that must be taken at each stop, or the expected duration of each stop. For example, transit conditions, such as road construction, traffic, or weather, may all impact the duration of protection for the sensitive products or materials, either directly (where, for example, unexpectedly hot weather will reduce the expected duration of maintaining temperature) or indirectly (where, for example, unexpectedly heavy traffic does not directly impact the expected duration of maintaining temperature, but determines that a stop must be made because the duration of transit will be longer than expected).

In some or all of these actions, external information may be inputted into the system to allow measurements, estimations, and appropriate actions. Weather, traffic, and road repair, have been noted. Historical information about transit routes is also included. This external information is combined with internal information, such as current temperature of the sensitive products or materials, possible damage to the packaging of the sensitive products or materials, latent energy reserve in the PCM packaging, to estimate and then execute actions required to protect the sensitive products and materials. The system may include, as part of the Internet of things ("IoT"), additional sensors that are embedded directly into the sensitive products or materials, and these sensors can provide real-time (or close to real-time) measurements of various properties of the sensitive products or materials, such as temperature, EM properties, pressure, and others.

Figure 6:
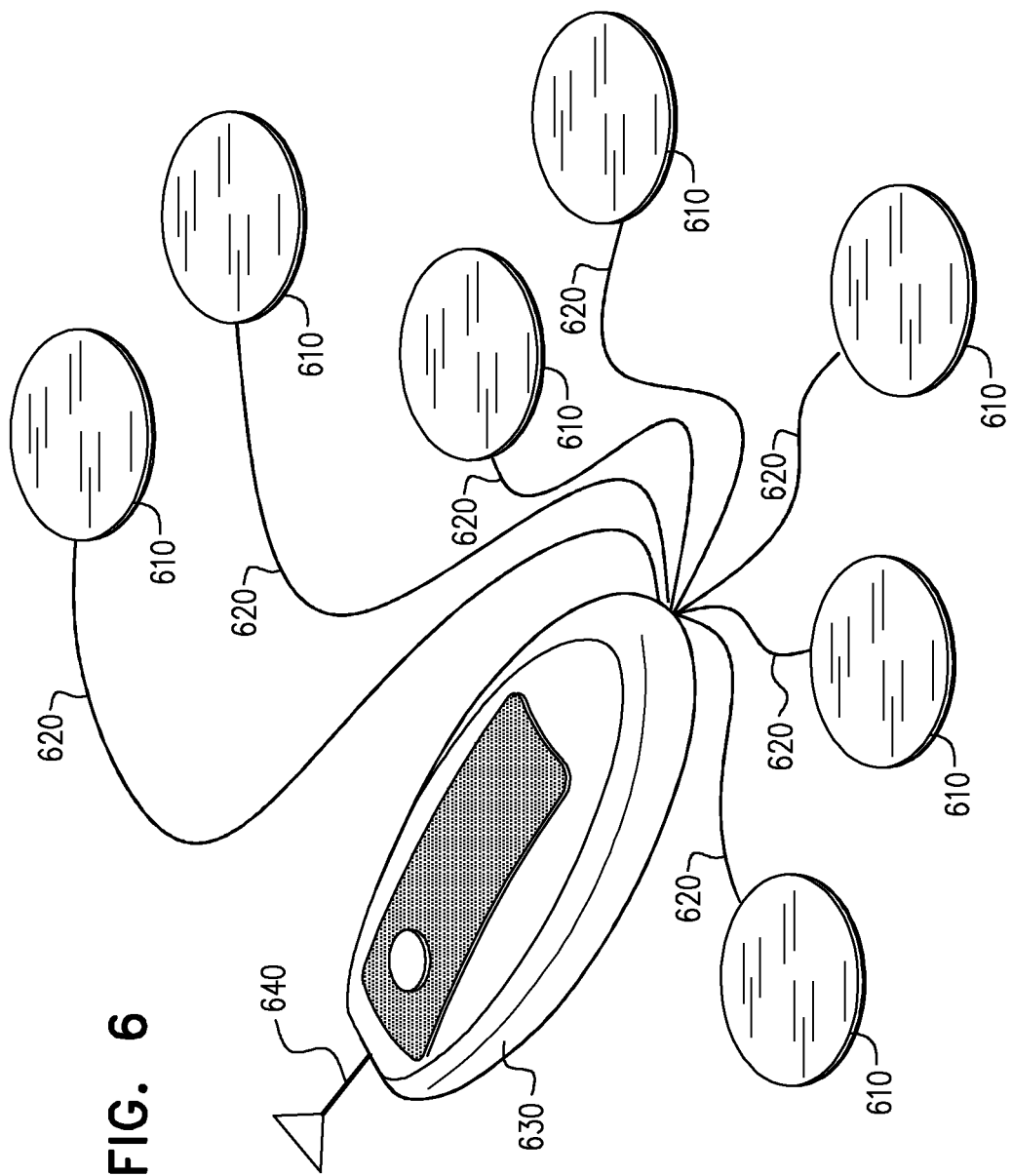
FIG. 6 illustrates one alternative embodiment of multiple sensors aggregated into a single sensor which is in communicative connection to the outside world.

FIG. 6 illustrates one alternative embodiment of a sensor 630 that includes multiple sensing elements. 610 connected via 620. The sensor unit 630 is connected via 640 to a transceiver 650, which may transmit measurements to an outside transceiver. In some embodiments, the sensor unit 630 is "thin" in the sense that it only receives and passes on measurements, and perhaps it may in addition create an order in which the various measurements are passed to the transceiver 650. In some embodiments, the central sensor unit 630 is relatively "heavy" or "fat", in that it may store measurements and/or process measurements related to the state of the PCM material measured by the sensors or the projected state of the sensitive products or material protected by the PCM material. The sensor unit 630 may be placed into the system shown in FIG. 4, in which case it would be the box shown between lines 440 and transceiver 450 and the sensing elements would be pressure sensors 430.

FIG. 7 illustrates one alternative embodiment of a thermal packaging solution, including multiple PCM containers and a PCM package including a transceiver in communication with an outside transceiver. In the embodiment shown, there are five soft shelled PCM containers 710 and one PCM package 720. The PCM package 720 may be in any of the forms illustrated and discussed in regards to FIGS. 1, 2, and 3. In the embodiment shown the soft PCM containers 710 and PCM package 720 are physically connected to form what is sometimes referred to as a PCM surface or blanket. In alternative embodiments, there may be one, two, or any other number of soft shelled PCM containers 710 and or any other number of PCM packages 720. In alternative embodiments, the soft PCM containers 710 and PCM package 720 are not physically connected. In alternative embodiments, a thermal packaging solution, including at least one PCM package and at least one soft shelled PCM container. In some embodiments, the PCM packages and or PCM containers are not physically connected, however, they are in close proximity to one another. There is at least one sensor 730 which is in communicative connection with at least one PCM package, there is a transceiver 750 in communicative contact with an external transceiver, and there is a line of communication 740 from the sensor 730 to transceiver 750.

A PCM container is most often cheaper than a PCM package. A thermal packaging solution that includes at least one PCM package and additional PCM containers is potentially cheaper and lighter than an equivalent solution that includes only PCM packages. The thermal packaging solution that includes at least one PCM package and additional PCM containers, provides comparable prediction capabilities with respect to current and future levels of latent heat in all of the PCM package and containers in the solution in that the PCM package and PCM containers are within close proximity.

The soft shelled PCM container 710 are "soft shelled" in the sense that a significant portion of such packaging is flexible, such that the packages may be placed in non-straight or other irregular configurations. "Soft shelled containers" are adaptable in shape such that they may effectively and efficiently cover the sensitive products and materials.

In alternative embodiments, one or more of the elements marked as 710 in FIG. 7 are not PCM packages but rather "thermal blankets". In this sense, a "thermal blanket" is a solid, but flexible-surface material, that is composed of or includes within it a thermally insulating material. Therefore, in these embodiments the system includes advantages of real-time (or close to real-time) measurement, temperature protection through use of one or more PCM packages, and heat retention through the use of one or more thermal blankets. In some of these embodiments, there is at least one PCM package 720, at least one sensor 730, at least one transceiver 750, and a communication connection 740 from the sensor 730 to the transceiver 750. In some embodiments, the thermal blanket includes a sensing element, such as a conductive wire or strip, that is embedded within the insulation material or that surrounds the package or that connected to the thermal blanket, and if the wire is torn or damaged or stressed, that change to the wire is communicated to either to a sensor in direct communicative contact with a PCM package (in which case the communication is within the system) and/or from the sensing element embedded in the thermal blanket to a transceiver located outside the system (in which case the sensing element is acting as an example of the Internet of Things). Damage to the thermal blanket, or to the wire or strip within the thermal blanket, is one measurement that may be used to decide upon and activate actions to protect the temperature sensitive products or materials.

In various embodiments, the information aggregator 490 is in communicative contact via the transceiver 470 with a mesh network (not shown), in which the mesh network maximizes connection of the system in FIG. 4 to the outside world. In some embodiments, there may be projected, either by the information aggregator 490 or by an external processor, different economic impacts on the shipped products or materials if various actions are taken or not taken at specific times. Such actions include, for example, changing the quantity of the sensitive products or materials, changing the quantity of the PCM material or of the number PCM packages, changing the route of transit, changing the type of transmit (for example, train, or truck, or plane), and others. In some embodiments, the physical and economic effects of adding ice to the system may be projected.

In this description, numerous specific details are set forth. However, the embodiments/cases of the invention may be practiced without some of these specific details. In other instances, well-known hardware, materials, structures and techniques have not been shown in detail in order not to obscure the understanding of this description. In this description, references to "one embodiment" and "one case" mean that the feature being referred to may be included in at least one embodiment/case of the invention. Moreover, separate references to "one embodiment", "some embodiments", "one case", or "some cases" in this description do not necessarily refer to the same embodiment/case. Illustrated embodiments/cases are not mutually exclusive, unless so stated and except as will be readily apparent to those of ordinary skill in the art. Thus, the invention may include any variety of combinations and/or integrations of the features of the embodiments/cases described herein. Also herein, flow diagrams illustrate non-limiting embodiment/case examples of the methods, and block diagrams illustrate non-limiting embodiment/case examples of the devices. Some operations in the flow diagrams may be described with reference to the embodiments/cases illustrated by the block diagrams. However, the methods of the flow diagrams could be performed by embodiments/cases of the invention other than those discussed with reference to the block diagrams, and embodiments/cases discussed with reference to the block diagrams could perform operations different from those discussed with reference to the flow diagrams. Moreover, although the flow diagrams may depict serial operations, certain embodiments/cases could perform certain operations in parallel and/or in different orders from those depicted. Moreover, the use of repeated reference numerals and/or letters in the text and/or drawings is for the purpose of simplicity and clarity and does not in itself dictate a relationship between the various embodiments/cases and/or configurations discussed. Furthermore, methods and mechanisms of the embodiments/cases will sometimes be described in singular form for clarity. However, some embodiments/cases may include multiple iterations of a method or multiple instantiations of a mechanism unless noted otherwise. For example, when a controller or an interface are disclosed in some embodiments/cases, the scope of the embodiment/case is intended to also cover the use of multiple controllers or interfaces.

Certain features of the embodiments/cases, which may have been, for clarity, described in the context of separate embodiments/cases, may also be provided in various combinations in a single embodiment/case. Conversely, various features of the embodiments/cases, which may have been, for brevity, described in the context of a single embodiment/case, may also be provided separately or in any suitable sub-combination. The embodiments/cases are not limited in their applications to the details of the order or sequence of steps of operation of methods, or to details of implementation of devices, set in the description, drawings, or examples. In addition, individual blocks illustrated in the figures may be functional in nature and do not necessarily correspond to discrete hardware elements. While the methods disclosed herein have been described and shown with reference to particular steps performed in a particular order, it is understood that these steps may be combined, subdivided, or reordered to form an equivalent method without departing from the teachings of the embodiments/cases. Accordingly, unless specifically indicated herein, the order and grouping of the steps is not a limitation of the embodiments/cases. Embodiments/cases described in conjunction with specific examples are presented by way of example, and not limitation. Moreover, it is evident that many alternatives, modifications and variations will be apparent to those skilled in the art. Accordingly, it is intended to embrace all such alternatives, modifications and variations that fall within the spirit and scope of the appended claims and their equivalents.

What is claimed is:

1. A system for protecting products or materials that are sensitive to variations in temperature, comprising:
    a phase change material (PCM) container containing PCM, wherein said PCM container has at least one section composed of flexible material that changes shape in relation to a change in an enthalpy within the PCM;
    a container containing a non-solid, and said container containing the non-solid has at least one section composed of flexible material that changes shape in relation to the change in the enthalpy within the PCM; wherein the non-solid differs from the products or materials that are sensitive to the variation in temperature; and
    a pressure sensor that senses the pressure or fluctuations of pressure in the PCM container,
    wherein the at least one flexible section of the PCM container is in physical contact with the at least one flexible section of the container containing the non-solid, and
    wherein all of the sections of the PCM container that are not in contact with a flexible section of the container containing the non-solid, and all of the sections of the container containing the non-solid that are not in contact with the PCM container, are rigid sections that maintain their shape against changes in pressure.

2. The system of claim 1, further comprising another pressure sensor that measures a pressure or fluctuations of pressure in the container containing the non-solid, and that communicates its measurements to a wireless unit, wherein the wireless unit transmits the measurements of said sensor to a wireless receiver.

3. The system of claim 2, further comprising:
    a wireless mesh network; and
    a gateway that connects the wireless receiver to the wireless mesh network.

4. The system of claim 3, further comprising ice in contact with or in close proximity to the products or materials that are sensitive to variations of temperature.

5. The system of claim 4, wherein the PCM container and the container containing the non-solid are in contact or in close proximity on only one side of the PCM container and only one side of the container containing the non-solid.

6. The system of claim 4, wherein the container containing the non-solid is located entirely within the PCM container.

7. The system of claim 4, wherein the PCM container is shaped with a recess on one of its sides, and the container containing the non-solid is placed within said recess such that the PCM container is in contact with or in close proximity to three sides of the container with gas.

8. The system of claim 1, in which the system is insensitive to its physical orientation in relation to the ground.

9. The system according to claim 1 wherein an exterior of the PCM container and an exterior of the container with the non-solid are formed from the rigid sections that maintain their shape against changes in pressure.

10. The system according to claim 1 wherein all but one side of the container with the non-solid is surrounded by the PCM container.

11. A system for protecting products or materials that are sensitive to variations in temperature, comprising:
    a phase change material (PCM) container containing PCM, that is in contact with or close proximity to products or materials that are sensitive to variations in temperature; and
    a plurality of sensors that comprise a pressure sensor that is configured to measure a pressure or fluctuations of pressure of the PCM in the PCM container, and that communicate such measurements to an integration unit,
    wherein the integration unit is communicatively connected to all of the sensors, receives measurements that are communicated by the sensors, aggregates the measurements, and then transmits the aggregated measurements to a receiver that receives such aggregated measurements,
    wherein the aggregation unit is configured to transmit wirelessly, and also configured to transmit by wireline, and
    wherein there are multiple PCM containers and one or more sensors are in contact with or close proximity to each of the PCM containers.

12. The system of claim 11, further comprising:
a wireless mesh network; and
a gateway that connects the wireless receiver to the wireless mesh network,
wherein the gateway is communicatively connected to the integration unit.

13. The system of claim 12, wherein the plurality of sensors comprise other sensors, in addition to the pressure sensor, wherein the other sensor are configured to sense at least one property of the PCM that is selected from the group consisting of: a volume of the PCM contained in the PCM container, an electrical resistance of the PCM, a capacitance of the PCM, an optical transparency of the PCM, an acoustical properties of the PCM, an electromagnetic propagation properties of the PCM, and a humidity of an environment in which the PCM is located.

14. The system of claim 13, further comprising ice in contact with or in close proximity to the products or materials that are sensitive to variations of temperature.

15. A method for protecting products or materials that are sensitive to variations in temperature, comprising:
positioning a phase change material (PCM) container that includes a PCM so that the PCM is in contact with or close proximity to the products or materials that are sensitive to variations in temperature;
measuring in real time, by a pressure sensor, a pressure or fluctuations of pressure created on a container containing non-solid, wherein the fluctuations of pressure result from a changing of an enthalpy within the PCM; wherein the non-solid differs from the products or materials that are sensitive to the variation in temperature;
and
communicating such measurements from the sensor to a communication unit;
wherein said PCM container has at least one section composed of flexible material that changes shape in relation to the change in the enthalpy within the PCM;
wherein the container containing the non-solid has at least one section composed of flexible material that changes shape in relation to the change enthalpy within the PCM;
wherein the at least one flexible section of the PCM container is in physical contact with the at least one flexible section of the container containing the non-solid, and wherein all of the sections of the PCM container that are not in contact with a flexible section of the container containing the non-solid, and all wherein of the sections of the container containing the non-solid that are not in contact with the PCM container rigid sections that maintain their shape against changes in pressure.

16. The method according to claim 15, comprising receiving, by the communication unit, the measurements and then transmitting the measurements to a receiver configured to receive the measurements.

17. The method according to claim 16, further comprising receiving, by a gateway, the measurements from the communication unit, and communicating, by the gateway, the measurements to a mesh network.

18. The method according to claim 15, comprising measuring, by multiple sensors, monitored properties of the PCM, and communicating measurements of the multiple sensors to an integration unit.

19. The method according to claim 15,
comprising measuring, by multiple sensors, monitored properties of the PCM that are positioned at a plurality of PCM containers, and communicating measurements of the multiple sensors to an integration unit.

20. The method according to claim 19, comprising receiving the measurements of the multiple sensors by the integration unit, transmitting, by the integration unit the measurements of the multiple sensors to a gateway through a mesh network.

21. The method according to claim 20, comprising receiving by the gateway information external to the system and said information is relevant to temperature control of the temperature sensitive products or materials.

22. The method according to claim 21, comprising determining by an aggregator unit that is coupled to the integration unit, which action to be taken to protect the temperature sensitive products or materials, said action selected from the group consisting of changing the transit route, changing the mode of transit, adding additional temperature sensitive products or materials to the system, removing part of the temperature sensitive products or materials from the system, adding an additional stop in the process of transit, and removing a planned stop in the process of transit.

* * * * *